US007912792B2

(12) United States Patent
Lehrman et al.

(10) Patent No.: US 7,912,792 B2
(45) Date of Patent: Mar. 22, 2011

(54) SYSTEMS AND METHODS FOR MAKING MARGIN-SENSITIVE PRICE ADJUSTMENTS IN AN INTEGRATED PRICE MANAGEMENT SYSTEM

(75) Inventors: Gary S. Lehrman, Cupertino, CA (US); Rafael A. Gonzalez-Caloni, Redwood Shores, CA (US); Narayanan Vijaykumar, Cupertino, CA (US); Niel Esary, Mountain View, CA (US)

(73) Assignee: Vendavo, Inc., Palo Alto, CA (US)

( * ) Notice: Subject to any disclaimer, the term of this patent is extended or adjusted under 35 U.S.C. 154(b) by 1028 days.

(21) Appl. No.: 10/914,715

(22) Filed: Aug. 9, 2004

(65) Prior Publication Data
US 2006/0031178 A1 Feb. 9, 2006

Related U.S. Application Data

(63) Continuation-in-part of application No. 10/615,166, filed on Jul. 7, 2003, now abandoned.

(60) Provisional application No. 60/395,703, filed on Jul. 12, 2002.

(51) Int. Cl.
*G06Q 99/00* (2006.01)
(52) U.S. Cl. ............ 705/400; 705/1.1; 705/10; 705/20; 705/26; 705/27; 705/36; 704/10
(58) Field of Classification Search .............. 705/1, 400, 705/26–27, 10, 35, 1.1, 20; 704/10
See application file for complete search history.

(56) References Cited

U.S. PATENT DOCUMENTS

| 3,806,711 | A | 4/1974 | Cousins, Jr. |
| 5,053,957 | A | 10/1991 | Suzuki |
| 5,224,034 | A | 6/1993 | Katz et al. |
| 5,461,708 | A | 10/1995 | Kahn |
| 5,497,489 | A | 3/1996 | Menne |
| 5,537,590 | A | 7/1996 | Amado |
| 5,590,269 | A | 12/1996 | Kruse et al. |
| 5,670,984 | A | 9/1997 | Robertson et al. |

(Continued)

FOREIGN PATENT DOCUMENTS
WO   WO 99/60486   11/1999
(Continued)

OTHER PUBLICATIONS

Beidi, Richard, "The coming of risk-based pricing: Part Two", Oct. 2000, Mortgage Banking. Washington, vol. 61, Iss. 1; p. 156, 12 pgs.*

(Continued)

*Primary Examiner* — John W Hayes
*Assistant Examiner* — Freda A Nelson
(74) *Attorney, Agent, or Firm* — Kang S. Lim

(57) ABSTRACT

Systems and methods for generating margin sensitive pricing quotation in an integrated price adjustment system including: a) selecting products in selected product sets; b) providing pricing data corresponding to the products in selected product sets; c) providing guidance elements for products in selected product sets wherein guidance elements are margin sensitive; d) calculating guidance prices for products based upon guidance elements; e) selecting one of either pricing data or guidance prices; and f) generating a quotation based upon selections made such that margin sensitive pricing adjustments are incorporated into quotations. In some example embodiments, the present invention further includes providing predetermined suggestions for modifying the quotation.

22 Claims, 12 Drawing Sheets

U.S. PATENT DOCUMENTS

| | | |
|---|---|---|
| 5,689,287 A | 11/1997 | Mackinlay et al. |
| 5,710,887 A | 1/1998 | Chelliah et al. |
| 5,740,448 A | 4/1998 | Gentry et al. |
| 5,758,327 A | 5/1998 | Gardner et al. |
| 5,808,894 A | 9/1998 | Wiens et al. |
| 5,870,717 A | 2/1999 | Wiecha |
| 5,873,069 A | 2/1999 | Reuhl et al. |
| 5,878,400 A | 3/1999 | Carter, III |
| 5,946,666 A | 8/1999 | Nevo et al. |
| 6,009,407 A | 12/1999 | Garg |
| 6,075,530 A | 6/2000 | Lucas et al. |
| 6,078,901 A | 6/2000 | Ching |
| 6,151,031 A | 11/2000 | Atkins et al. |
| 6,211,880 B1 | 4/2001 | Impink, Jr. |
| 6,320,586 B1 | 11/2001 | Plattner et al. |
| 6,434,533 B1 | 8/2002 | Fitzgerald |
| 6,553,350 B2 | 4/2003 | Carter |
| 6,665,577 B2 | 12/2003 | Onyshkevych |
| 6,678,695 B1 | 1/2004 | Bonneau et al. |
| 6,785,664 B2 | 8/2004 | Jameson |
| 6,801,201 B2 | 10/2004 | Escher |
| 6,812,926 B1 | 11/2004 | Rugge |
| 6,851,604 B2 | 2/2005 | Girotto et al. |
| 6,856,967 B1 | 2/2005 | Woolston et al. |
| 6,907,403 B1 | 6/2005 | Klein et al. |
| 6,988,076 B2 | 1/2006 | Ouimet |
| 7,015,912 B2 | 3/2006 | Marais |
| 7,046,248 B1 | 5/2006 | Perttunen |
| 7,076,463 B1 | 7/2006 | Boies et al. |
| 7,080,026 B2 | 7/2006 | Singh et al. |
| 7,092,929 B1 | 8/2006 | Dvorak et al. |
| 7,133,848 B2 | 11/2006 | Phillips et al. |
| 7,149,716 B2 | 12/2006 | Gatto |
| 7,155,510 B1 | 12/2006 | Kaplan |
| 7,218,325 B1 | 5/2007 | Buck |
| 7,233,928 B2 | 6/2007 | Huerta et al. |
| 7,254,584 B1 | 8/2007 | Addison, Jr. |
| 7,308,421 B2 | 12/2007 | Raghupathy et al. |
| 7,315,835 B1 | 1/2008 | Takayasu et al. |
| 7,343,355 B2 | 3/2008 | Ivanov et al. |
| 2001/0003814 A1 | 6/2001 | Hirayama et al. |
| 2002/0007323 A1 | 1/2002 | Tamatsu |
| 2002/0032610 A1 | 3/2002 | Gold et al. |
| 2002/0042782 A1 | 4/2002 | Albazz et al. |
| 2002/0052817 A1 | 5/2002 | Dines et al. |
| 2002/0059058 A1* | 5/2002 | Doolin et al. .................. 704/10 |
| 2002/0059229 A1 | 5/2002 | Natsumeda et al. |
| 2002/0072993 A1 | 6/2002 | Sandus et al. |
| 2002/0099596 A1 | 7/2002 | Geraghty |
| 2002/0107819 A1 | 8/2002 | Ouimet |
| 2002/0116348 A1 | 8/2002 | Phillips et al. |
| 2002/0128953 A1 | 9/2002 | Quallen et al. |
| 2002/0152133 A1 | 10/2002 | King et al. |
| 2002/0152150 A1 | 10/2002 | Cooper et al. |
| 2002/0156695 A1 | 10/2002 | Edwards |
| 2002/0165726 A1 | 11/2002 | Grundfest |
| 2002/0165760 A1 | 11/2002 | Delurgio et al. |
| 2002/0178077 A1* | 11/2002 | Katz et al. ...................... 705/26 |
| 2002/0188576 A1 | 12/2002 | Peterson et al. |
| 2002/0194051 A1 | 12/2002 | Hall et al. |
| 2003/0028451 A1* | 2/2003 | Ananian ......................... 705/27 |
| 2003/0033240 A1 | 2/2003 | Balson et al. |
| 2003/0095256 A1 | 5/2003 | Cargill et al. |
| 2003/0110066 A1 | 6/2003 | Walser et al. |
| 2003/0115129 A1 | 6/2003 | Feaver et al. |
| 2003/0126053 A1 | 7/2003 | Boswell et al. |
| 2003/0130883 A1 | 7/2003 | Schroeder et al. |
| 2003/0167209 A1 | 9/2003 | Hsieh |
| 2003/0191723 A1 | 10/2003 | Foretich et al. |
| 2003/0195810 A1 | 10/2003 | Raghupathy et al. |
| 2003/0200185 A1 | 10/2003 | Huerta et al. |
| 2003/0225593 A1 | 12/2003 | Ternóey et al. |
| 2003/0229552 A1 | 12/2003 | Lebaric et al. |
| 2004/0024715 A1 | 2/2004 | Ouimet |
| 2004/0049470 A1 | 3/2004 | Ouimet |
| 2004/0078288 A1 | 4/2004 | Forbis et al. |
| 2004/0117376 A1 | 6/2004 | Lavin et al. |
| 2004/0128225 A1 | 7/2004 | Thompson et al. |
| 2004/0133526 A1 | 7/2004 | Shmueli et al. |
| 2004/0193442 A1 | 9/2004 | Kimata et al. |
| 2004/0267674 A1 | 12/2004 | Feng et al. |
| 2004/0267676 A1* | 12/2004 | Feng et al. ...................... 705/400 |
| 2005/0004819 A1 | 1/2005 | Etzioni et al. |
| 2005/0096963 A1 | 5/2005 | Myr et al. |
| 2005/0197857 A1 | 9/2005 | Avery |
| 2005/0197971 A1 | 9/2005 | Kettner et al. |
| 2005/0256778 A1 | 11/2005 | Boyd et al. |
| 2005/0267831 A1 | 12/2005 | Esary et al. |
| 2005/0278227 A1 | 12/2005 | Esary et al. |
| 2006/0004861 A1 | 1/2006 | Albanese et al. |
| 2006/0031179 A1 | 2/2006 | Lehrman |
| 2006/0069585 A1 | 3/2006 | Springfield et al. |
| 2006/0241923 A1 | 10/2006 | Xu et al. |

FOREIGN PATENT DOCUMENTS

| | | |
|---|---|---|
| WO | WO 00/29995 | 5/2000 |
| WO | WO 2005/119500 | 12/2005 |

OTHER PUBLICATIONS

Kenton et al., "Planning a revenue stream system in an e-business environment", 2001, Industrial Management, 101, p. 406-413, 8/9; ABI/INFORM Global.*

"eMerchant, Magic Software's Powerful New Busines-to-Business E-commerce Solution, Wins "Best of Show" At Internet Commerce Expo", Apr. 1, 1999, Business Wire, p. 0017 (2 pgs).*

Bourne, Humprey, "Pricing the Strategic Implications", Mar. 1999, Management Accounting: Magazine for Chartered management Accountants; vol. 77 Issue 3, p. 26, 1p, 1c (3pgs).*

Bourne, Humprey, "Pricing the Strategic Implications", Mar. 1999, Management Accounting: Magazine for Chartered Management Accountants; vol. 77 Issue 3, p. 26, (3pgs).*

Kenton et al., "Planning a revenue stream system in an e-business environment", 2001, Industrial Management, 101, p. 406-413.*

Origin 7.0 Help (including 21 sheets of screen shots), 2000.

Microsoft Excel 2000, 1985-1999.

Marn, Michael V. and Robert L. Rosiello, "Managing Price, Gaining Profit," Harvard Business Review, pp. 84-93 (Sep.-Oct. 1992).

"PCT International Search Report", Application No. PCT/US07/10754, mailed Nov. 7, 2007.

"PCT International Search Report", Application No. PCT/US05/14879, mailed Apr. 16, 2007.

"Written Opinion of the International Searching Authority", Application No. PCT/US05/14879, mailed Apr. 16, 2007.

"Written Opinion of the International Searching Authority", Application No. PCT/US05/14981, mailed Nov. 27, 2006.

"Written Opinion of the International Searching Authority", Application No. PCT/US05/14883, mailed Oct. 3, 2006.

"Net Commerce Launches Its FastTrack Configurator and FasPac Catalog Utility", Apr. 17, 2001, Business Wire. New York. p. 1.

"SPEX Assesses B2C and B2B Electronic Commerce Software Maturity", PR Newswire. New York: p. 1.

Murphy, Diane R., "The Exciting Role of the Credit Manager in the Expanding E-Commerce Marketplace", Business Credit, vol. 10, No. 9, p. 64, Oct. 2000.

"PCT International Search Report", Application No. PCT/US07/11571, mailed Jan. 7, 2008.

"PCT International Search Report and the Written Opinion of the International Searching Authority", Application No. PCT/US 07/23740, mailed Mar. 3, 2008.

Walker, Kenton B. et al., "Planning a Revenue Stream System in an E-Business Environment", 2001, Industrial Management—Data Systems, p. 406-413, 8/9; ABI/INFORM Global, pp. 406-413.

"PCT International Search Report and the Written Opinion of the International Searching Authority", Application No. PCT/US07/18663, mailed Aug. 26, 2008.

Bhattacharya, Anindya et al. "Using 'smart' pricing to increase profits and maximize customer satisfaction", Aug. 2001, The National Public Accountant; vol. 25, Issue 6, pp. 34-38.

Kim, Byung-Do et al., "Modeling the Distribution of Price Sensitivity and Implications for Optimal Retail Pricing", Jul. 1995, Journal of Business & Economic Statistics; vol. 13, Issue 3, pp. 291-303.

Levy, Michael et al., "Emerging Trends in Retail Pricing Practice: Implications for Research", 2004, Journal of Retailing; vol. 80, 9 pgs.

Hung, Chao-Shun, "Conjectural Variations and Market Performance in a Differentiated Product Industry", Dec. 1991, Atlantic Economic Journal; vol. 19, Issue 4, 18 pgs.

Dawes, John, "Assessing the Impact of a Very Successful Price Promotion on Brand, Category and Competitor Sales", 2004, The Journal of Product and Brand Management; vol. 13, Issue 5, p. 303-314.

Leeflang, Peter S. H. et al., "Marketing Decisions Based on Econometric Models", Spring 2002, Marketing Research; vol. 14, Issue 1, pp. 19-22.

Dawes, John, "Price Changes and Defection Levels in a Subscription-Type Market: Can An Estimation Model Really Predict Defecation Levels?", The Journal of Services Marketing; vol. 18, Issue 1, pp. 35-44.

Lucke, Dorothea et al., "A Note on R&D and Price Elasticity of Demand," Nov. 2005, Jahrbucher fur Nationalokonomie and Statistik; vol. 225, Issue 6, pp. 688-698.

Caru, Antonella et al. "Profitability and Customer Satisfaction in Services: An Integrated Perspective Between Marketing and Cost Management Analysis", 1999, International Journal of Service Industry Management; vol. 10, Issue 2, 14 pgs.

Tollefson, John O. et al., "Aggregation Criteria in Normative Market Segmentation Theory", Aug. 1978, Journal of Marketing Research; vol. 15, pp. 346-355.

Coulter, Keith S., "Decreasing Price Sensitivity Involving Physical Product Inventory: A Yield Management Application", 2001, The Journal of Product and Brand Management; vol. 10, Issue 5, pp. 301-317.

Mills, Don, "Oil Rises on Report Showing Gasoline Supply Decline", National Post, Ont; May 30, 2003.

Keenan, Faith, "The Price is Really Right," Business Week, Mar. 31, 2003.

Chan Choi, S., Desarbo, W. S., Harker, P. T. "Product Positioning under Price Competition." Feb. 1990. Management Science, vol. 36, Issue 2, pp. 175-199.

Kirschen, D. S., Strbac, G., Cumperayot, P., de Paiva Mendes, D. "Factoring the Elasticity of Demand in Electricity Prices." May 2000. IEEE Transactions on Power Systems, vol. 15, No. 2, pp. 612-617.

* cited by examiner

Dialog - Vendavo ADVANTAGE -- Web Page Dialog

SKU List
P8312:Test3
Alliant Energy Corporation
Group 1, Config 2 - Quote #000308330

Pricing View: [As Sold, Adjusted Cost ▼]

| SKU | Description | Quantity | List Price | Jul 04 | Aug 04 | Sep 04 | Oct 04 | Nov 04 | Dec 04 | Jan 05 | Feb 05 | Mar 05 |
|---|---|---|---|---|---|---|---|---|---|---|---|---|
| 220-9500 | LAT C610, 1.20GHZ,PIII,14.1 XG | 3 | $4,251 | $2,678 | $2,683 | $2,671 | $2,660 | $2,649 | $2,645 | $2,641 | $2,637 | $2,640 |
| 311-2036 | 512MB,1DIMM,SDRAM,LAT C610, | 3 | $807 | $459 | $434 | $461 | $461 | $461 | $462 | $462 | $462 | $462 |
| 340-3962 | 40GB HD,9.5MM,5400RPM,LAT Ci | 1 | $79 | $105 | $105 | $105 | $105 | $99 | $98 | $96 | $92 | $91 |
| 420-2315 | WINDOWS 2000,SP2,ENGLISH,L/ | 1 | $60 | $98 | $98 | $102 | $102 | $102 | $102 | $102 | $102 | $102 |
| 313-5205 | INTERNAL 56K MODEM,LAT C610 | 1 | $0 | $7 | $8 | $7 | $7 | $7 | $7 | $7 | $7 | $7 |
| 313-0249 | 24X CDROM,INT/EXT,LAT C-SER | 1 | $0 | $27 | $28 | $28 | $27 | $27 | $27 | $27 | $27 | $27 |
| 312-0108 | 4-CELL PRIMARY BATT,LAT C600 | 1 | $0 | $32 | $32 | $32 | $32 | $32 | $32 | $32 | $32 | $32 |
| 900-0310 | NBD LAT,INTL,BSC,INIT YR(COR | 1 | $109 | $0 | $0 | $0 | $0 | $0 | $0 | $0 | $0 | $0 |
| 900-2922 | NBD LAT,INTL,BSC,2YR EXT | 1 | $224 | $0 | $0 | $0 | $0 | $0 | $0 | $0 | $0 | $0 |
| | Total | | $5,530 | $3,405 | $3,387 | $3,406 | $3,395 | $3,377 | $3,371 | $3,365 | $3,358 | $3,360 |
| | Sell Price / Mgn $ | | $4,418 | $1,012 | $1,031 | $1,012 | $1,023 | $1,041 | $1,047 | $1,052 | $1,060 | $1,058 |
| | Margin % | | | 22.9% | 23.3% | 22.9% | 23.2% | 23.6% | 23.7% | 23.8% | 24.0% | 24.0% |

☐ = Roll Date (11/01/2003)

[Update Prices] [OK] [Cancel]

Add SKU(s): [_____] [add]

Removed SKU's

| SKU | Description | Quantity | List Price | Jul 04 | Aug 04 | Sep 04 | Oct 04 | Nov 04 | Dec 04 | Jan 05 | Feb 05 | Mar 05 |
|---|---|---|---|---|---|---|---|---|---|---|---|---|
| No entries in this table | | | | | | | | | | | | |

[add]

FIG. 11

Pricing Table

Table Name: UpSell
Description: Specifies promotional product up-sell relationships Find all Rows where field operator value

| Account | Industry | Product | Driver SKU | Upsell | StartDate | EndDate | Created |
|---|---|---|---|---|---|---|---|
| CA/ ISG | | Latitude | LAT D800,... | 8X DVD R... | 07/23/2003 | 11/26/2004 | |
| CA/ ISG | | Latitude | LAT D800,... | MOD,CASE... | 07/23/2003 | 11/26/2004 | |
| CA/ ISG | | OptiPlex D... | BASE,TSM... | MOD,PRM,... | 07/23/2003 | 11/26/2004 | |
| CA/ ISG | | Latitude | 128MB,1DI... | 512MB,1DI... | 06/04/2003 | 11/04/2004 | |
| CA/ ISG | | Inspiron | 4-CELL PRI... | 8-CELL PRI... | 06/04/2003 | 11/04/2004 | |

Search   Show All   Close

New   Copy   Edit   Edit All   Delete

Account Group: CA/ ISG
Industry:
Product Group: Inspiron
Driver SKU: 312-0108
Description: 4-CELL PRIMARY BATT,LAT C600
Driver SKU 2:
Description:

Upsell SKU: 312-0109
Description: 8-CELL PRIMARY BATT,LAT C600
Upsell SKU 2:
Description:
Discount: $0.00
Start Date: 06/04/2003
End Date: 11/04/2004
Forced:

SYSTEMS AND METHODS FOR MAKING MARGIN-SENSITIVE PRICE ADJUSTMENTS IN AN INTEGRATED PRICE MANAGEMENT SYSTEM

RELATED APPLICATIONS

This application is a continuation-in-part of U.S. patent application Ser. No. 10/615,166 filed on Jul. 7, 2003 now abandoned by MARAIS, entitled "SYSTEMS AND METHODS FOR PRICING PRODUCTS," which claims priority to provisional application Ser. No. 60/395,703 filed Jul. 12, 2002. The content of those applications are incorporated herein by reference.

This application is related to U.S. patent application Ser. No. 10/121,803 filed on Apr. 12, 2002 by HUERTA et al., entitled "RULE-BASED SYSTEM FOR DETERMINING PRICE ADJUSTMENTS IN A PRODUCT CATALOG," now U.S. Pat. 7,233,928 issued Jun. 19, 2007. The content of that application is incorporated herein by reference.

This application is related to U.S. patent application Ser. No. 10/121,816 filed on Apr. 12, 2002 by RAGHUPATHY et al. entitled "SYSTEM AND METHOD FOR GROUPING PRODUCTS IN A CATALOG,", now U.S. Pat. No. 7,308,421, issued Dec. 11, 2007. The content of that application is incorporated herein by reference.

BACKGROUND

At least two goals of creating pricing models are to analyze price behavior and to apply that analysis to real time transactions in order to preserve what are increasingly becoming narrower profit margins in complex transactions. Systems like, for example, SAP™, attempt to manage and control business processes using objective data in order to gain enterprise efficiencies. By manipulating objective data, these systems offer consistent metrics upon which businesses may make informed decisions and policies regarding the viability and direction of their products and services. However, in many cases, the decisions and policies may be difficult to procure as a result of the volume and organization of relevant data and may be difficult to implement as both temporal restraints and approval processes may inhibit rapid deployment of valuable information.

For example, referring to FIG. 1, FIG. 1 is a simplified graphical representation of an enterprise pricing environment. Several example databases (104-120) are illustrated to represent the various sources of working data. These might include, for example, Trade Promotion Management (TPM) 104, Accounts Receivable (AR) 108, Price Master (PM) 112, Inventory 116, and Sales Forecasts 120. The data in those repositories may be utilized on an ad hoc basis by Customer Relationship Management (CRM) 124, and Enterprise Resource Planning (ERP) 128 entities to produce and post sales transactions. The various connections 148 established between the repositories and the entities may supply information such as price lists as well as gather information such as invoices, rebates, freight, and cost information.

The wealth of information contained in the various databases (104-120) however, is not "readable" by executive management teams due in part to accessibility and in part to volume. That is, even though data in the various repositories may be related through a Relational Database Management System (RDMS), the task of gathering data from disparate sources can be complex or impossible depending on the organization and integration of legacy systems upon which these systems may be created. In one instance, all of the various sources may be linked to a Data Warehouse 132 by various connections 144. Typically, data from the various sources may be aggregated to reduce it to a manageable or human comprehensible size. Thus, price lists may contain average prices over some selected temporal interval. In this manner, data may be reduced. However, with data reduction, individual transactions may be lost. Thus, CRM 124 and ERP 128 connections to an aggregated data source may not be viable.

Analysts 136, on the other hand, may benefit from aggregated data from a data warehouse. Thus, an analyst 136 may compare average pricing across several regions within a desired temporal interval to develop, for example, future trends in pricing across many product lines. An analyst 136 may then generate a report for an executive committee 140 containing the findings. An executive committee 140 may then, in turn, develop policies that drive pricing guidance and product configuration suggestions based on the analysis returned from an analyst 136. Those policies may then be returned to CRM 124 and ERP 128 entities to guide pricing activities via some communication channel 152 as determined by a particular enterprise.

As can be appreciated, a number of complexities may adversely affect this type of management process. First, temporal setbacks exist at every step of the process. For example, a CRM 124 may make a sale. That sale may be entered into a sales database 120, and INV database 116, and an AR database 108. The entry of that data may be automatic where sales occur at a network computer terminal, or may be entered in a weekly batch process thus introducing a temporal setback. Another example of a temporal setback is time-lag introduced by batch processing data stored to a data warehouse resulting in weeks-old data that may not be timely for real-time decision support. Still other temporal setbacks may occur at any or all of the transactions illustrated in FIG. 1 that may ultimately render results untimely at best and irrelevant at worst. Thus, the relevance of an analyst's 136 original forecasts may expire by the time the forecasts reach the intended users. Still further, the usefulness of any pricing guidance and product configuration suggestions developed by an executive committee 140 may also have long since expired leaving a company exposed to lost margins.

As such, methods of displaying and using predictive structured data, integrating that data into coherent and relevant business policies such as pricing guidance and product configuration suggestions, and deploying those policies in a timely and efficient manner may be desirable to achieve price modeling efficiency and accuracy.

In view of the foregoing, Systems and Methods for Margin-Sensitive Price Adjustments in an Integrated Price Management System are disclosed.

SUMMARY

The present invention presents systems and methods generating margin sensitive pricing quotation in an integrated price adjustment system including: a) selecting products in selected product sets; b) providing pricing data corresponding to the products in selected product sets; c) providing guidance elements for products in selected product sets wherein guidance elements are margin sensitive; d) calculating guidance prices for products based upon guidance elements; e) selecting one of either pricing data or guidance prices; and f) generating a quotation based upon selections made such that margin sensitive pricing adjustments are incorporated into quotations. In some example embodiments, the present invention further includes providing predetermined suggestions for modifying the quotation.

In other embodiments, a computer program product for use in conjunction with a computer system for generating margin sensitive pricing quotation in an integrated price adjustment system, the computer program product comprising a computer readable storage medium and a computer program mechanism embedded therein, the computer program product including: a) instructions for selecting products in selected product sets; b) instructions for providing pricing data corresponding to the products in selected product sets; c) instructions for providing guidance elements for products in selected product sets wherein guidance elements are margin sensitive; d) instructions for calculating guidance prices for products based upon guidance elements; e) instructions for selecting one of either pricing data or guidance prices; and f) instructions for generating a quotation based upon selections made such that margin sensitive pricing adjustments are incorporated into quotations. In some example embodiments, the present invention further includes providing predetermined suggestions for modifying the quotation are presented.

BRIEF DESCRIPTION OF THE DRAWINGS

Embodiments of the invention may best be understood by reference to the following description taken in conjunction with the accompanying drawings in which:

FIG. 7 illustrates an example vendor proposal in an embodiment of the present invention;

FIG. 9 is a client-side example embodiment of displaying forecast data;

FIG. 11 is a back-side example embodiment of configuring an upsell configuration suggestion; and FIG. 12 is a client-side example embodiment of displaying a bundle suggestion.

DETAILED DESCRIPTION

Figure 1:
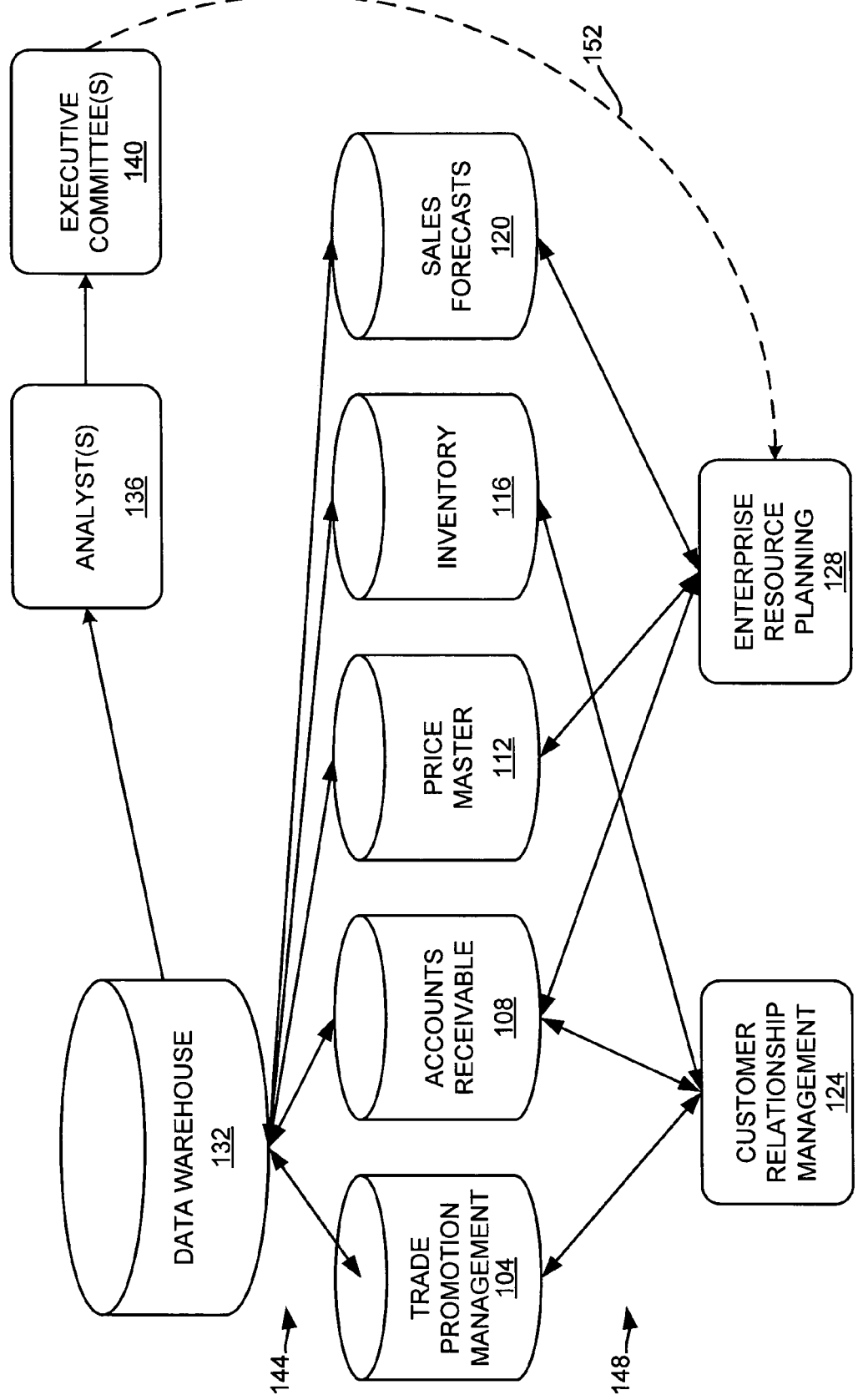
FIG. 1 is a simplified graphical representation of an enterprise level pricing environment.
Figure 2:
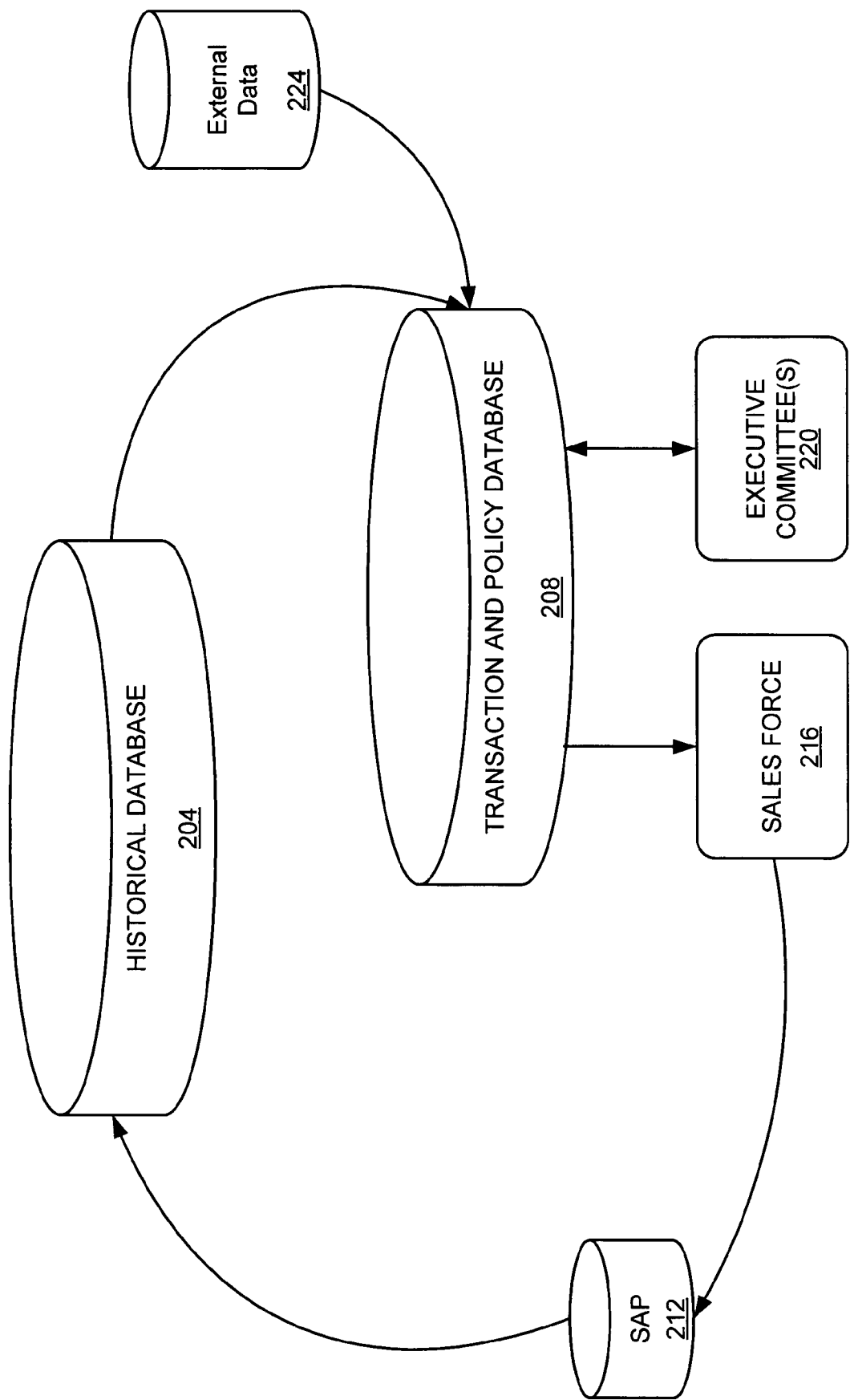
FIG. 2 is a simplified graphical representation of a price modeling environment where an embodiment of the present invention may be utilized.

As pertains to the present invention, FIG. 2 is a simplified graphical representation of a price modeling environment where an embodiment of the present invention may be utilized. A historical database 204, under the present invention may contain any of a number of records. In one embodiment of the present invention, a historical database may include sales transactions. In other embodiments of the present invention, a historical database may include waterfall records.

An analysis of a historical data may then be used to generate a transaction and policy database 208. For example, analysis of a selected group of transactions residing in a historical database may generate a policy that requires or suggests a rebate for any sale in a given region. In this example, some kind of logical conclusion or best guess forecast may determine that a rebate in a given region tends to stimulate more and better sales. A generated policy may thus be guided by historical sales transactions over a desired metric—in this case, sales by region. A policy may then be used to generate logic that will then generate a transaction item.

In this manner, a price list of one or many items reflecting a calculated rebate may be automatically conformed to a given policy and stored for use by a sales force, for example. In this example, a rebate may be considered as providing guidance to a sales force. Other guidance factors may be implemented and will be discussed in further detail below for FIG. 5. Furthermore, historical data may be used to generate configuration suggestions. Configuration suggestions will be discussed in further detail below for FIG. 6.

In some embodiments, policies are derived strictly from historical data. In other embodiments, policies may be generated ad hoc in order to test effects on pricing based hypothetical scenarios. In still other examples, executive committee(s) 220, who implements policies, may manually enter any number of policies relevant to a going concern. For example, an executive committee(s) 220 may incorporate forecast data from external sources 224 or from historical data stored in a historical database in one embodiment. Forecast data may comprise, in some examples, forward looking price estimations for a product or product set, which may be stored in a transaction and policy database. Forecast data may be used to generate sales policies such as guidance and suggestion as noted above. Still further, forecast data may be utilized by management teams to analyze a given deal to determine whether a margin corresponding to a deal may be preserved over a given period of time. In this manner, an objective measure for deal approval may be implemented. Thus forecast data, in some examples, may be used either to generate sales policy, to guide deal analysis, or both. Thus, in this manner, policies may be both generated and incorporated into the system.

After transactions are generated based on policies, a transactional portion of the database may be used to generate sales quotes by a sales force 216 in SAP 212, for example. SAP 212 may then generate a sales invoice which may then, in turn, be used to further populate a historical database 204. In some embodiments, sales invoices may be constrained to sales quotes generated by a transaction and policy database. That is, as an example, a sales quote formulated by a sales force 216 may require one or several levels of approval based on variance (or some other criteria) from policies (e.g. guidance and suggestion) stored in a transaction and policy database 208. In other embodiments, sales invoices are not constrained to sales quotes generated by a transaction and policy database.

Client-Side Operations

Figure 3:
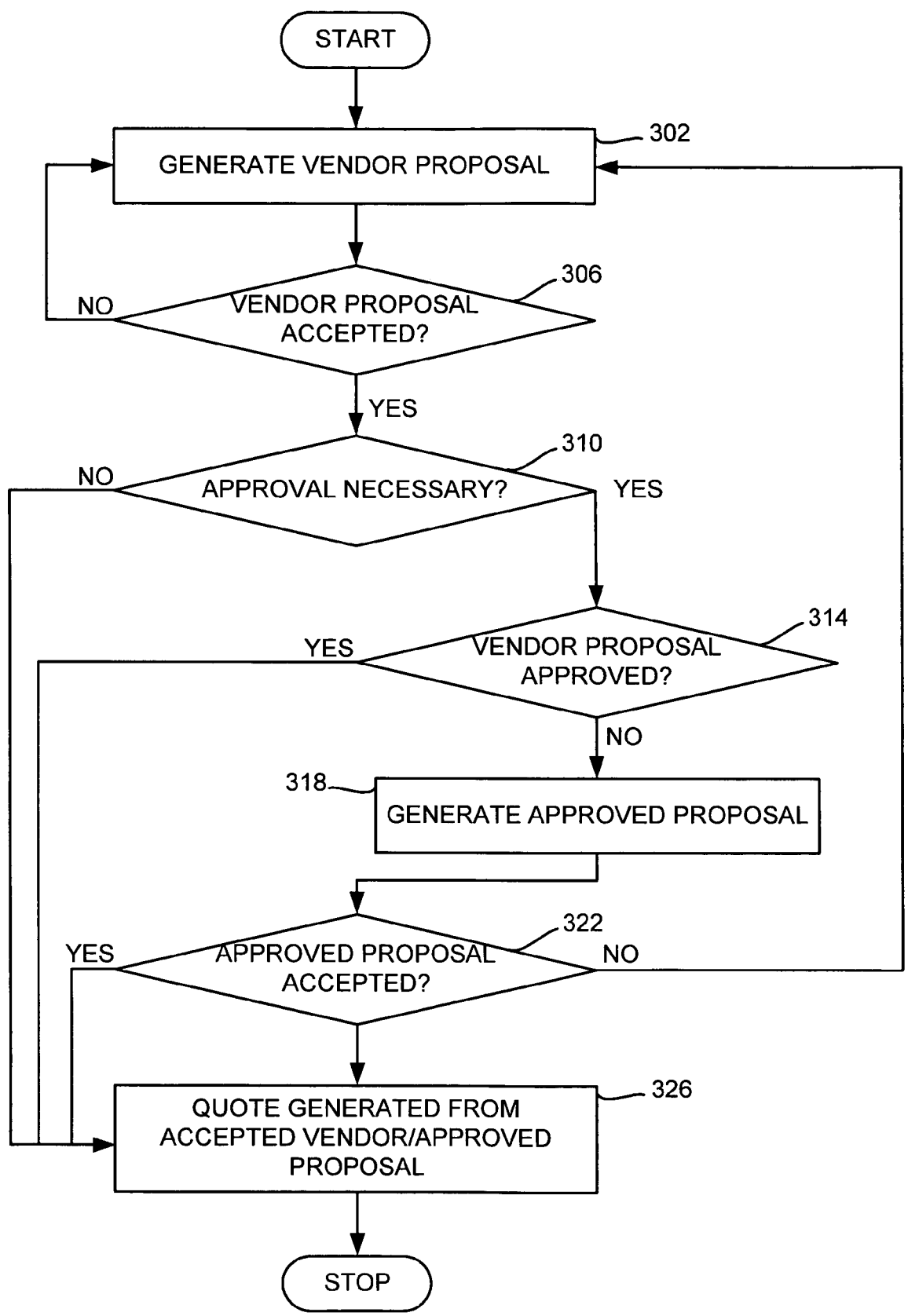
FIG. 3 is a client side flow chart of an embodiment of the present invention for generating a quotation.
Figure 7:
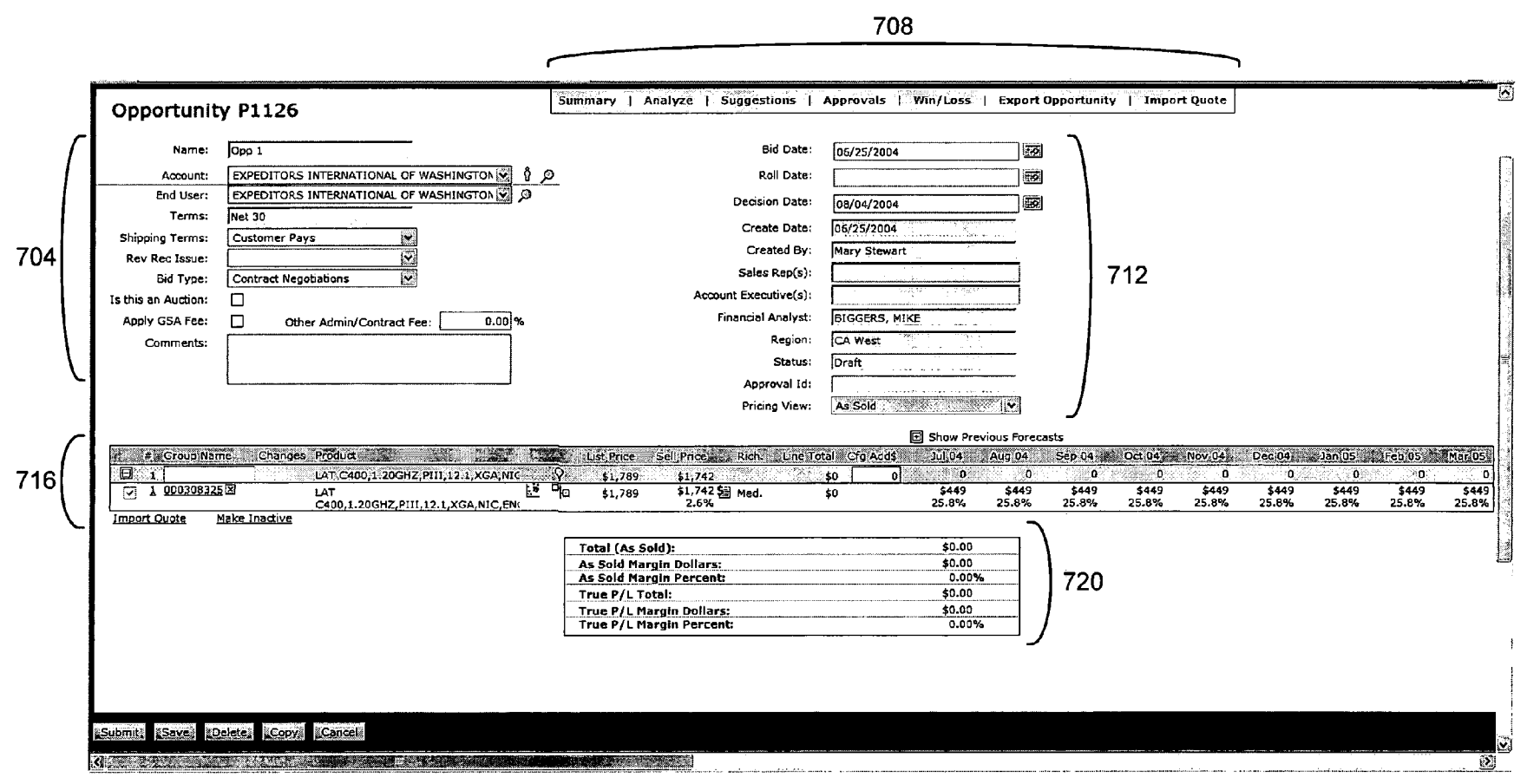

FIG. 3 illustrates an example method utilizing the present invention. In particular, FIG. 3 is a client side flow chart of an embodiment of the present invention for generating a quotation. Thus, for example, at a step 302, a vendor proposal may be generated. A vendor proposal represents an initial step in a negotiation process that may encompass many transactions. A sample vendor proposal is illustrated in FIG. 7 and will be discussed in further detail below for FIG. 7. A vendor proposal generally may contain enough relevant information for the proposal to be properly evaluated by a prospective buyer. Relevant information may include without limitation, account name, user name, general terms, shipping terms, bid type, bid date, pricing, product descriptions, and other generally known terms well known in the art. If a proposal is not accepted at a step 306, then a vendor may continue to generate vendor proposals at a step 302 until an accord is reached or until negotiation is terminated.

If a vendor proposal is accepted at a step 306, the method evaluates whether approval is necessary at a step 310. That is, for at least some vendor proposals, an approval process may be necessary depending on the terms of a deal both at a product level and at a product set level for a given time period. If it is determined that approval is not necessary, then the method generates a quote at a step 326 based upon a vendor proposal accepted at a step 306 whereupon the method ends. If approval is determined to be necessary at a step 310, the method determines whether a vendor proposal is approved at a step 314. Approval may be made at any of a number of administrative levels depending on the organizational structure of the business. Approval will be discussed in further detail for FIG. 8 below.

If a vendor proposal is approved, the method generates a quote at a step 326 based upon an approved vendor proposal generated at a step 306, whereupon the method ends. If a vendor proposal is not approved, an approved proposal may be generated at a step 318. As with a vendor proposal, an approved proposal may be accepted by a buyer at a step 322. If an approved proposal is accepted at a step 322, the method generates a quote at a step 326 based upon the approved proposal accepted at a step 322 whereupon the method ends. If an approved proposal is not accepted at a step 322, the method may continue to generate a vendor proposal at a step 302 whereupon the method continues until a quote is generated or negotiations are terminated.

Step 302—Generate Vendor Proposal

Figure 4:
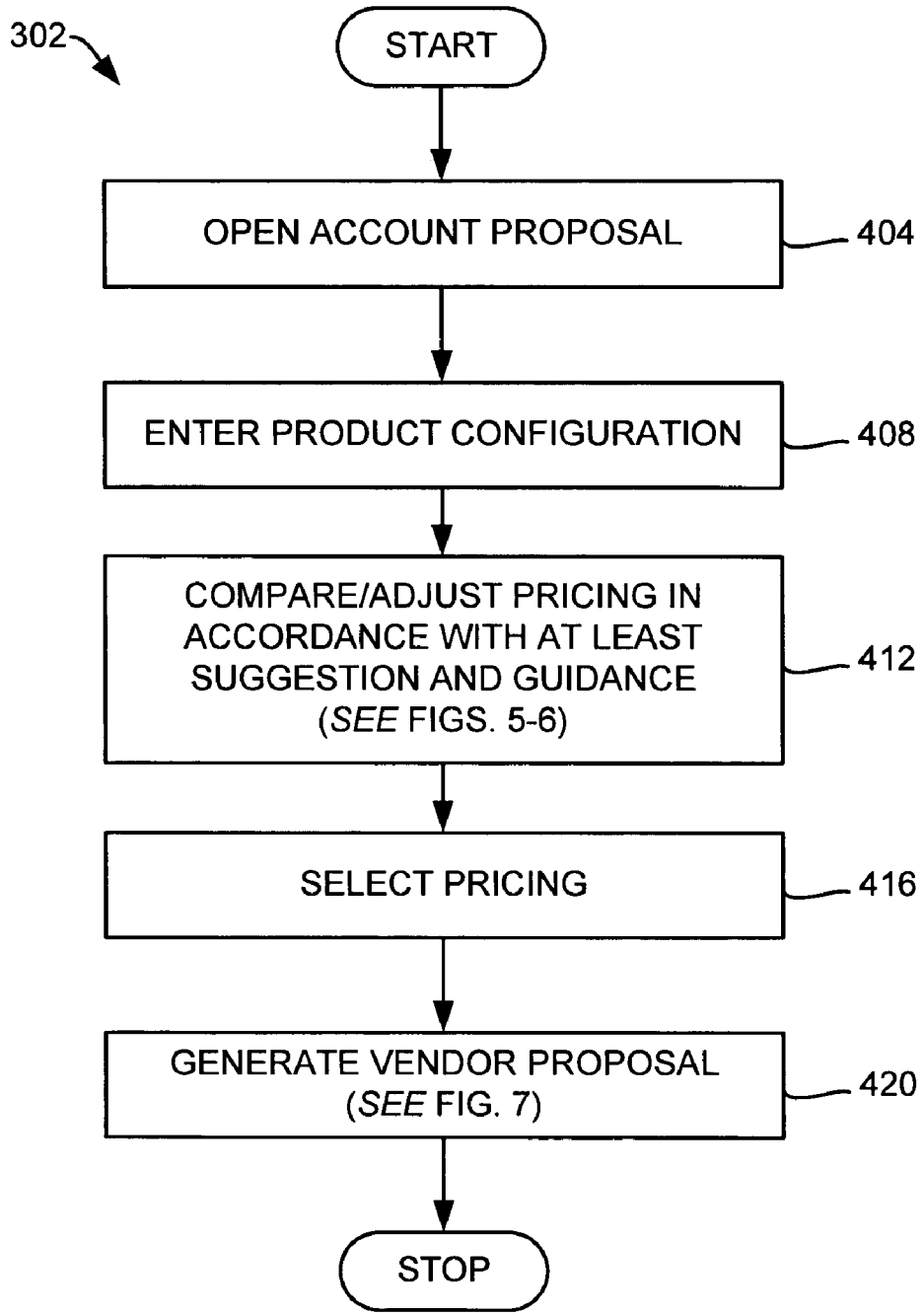
FIG. 4 is further illustrative of a step 302 (i.e. Generate Vendor Proposal) of FIG. 3.

FIG. 4 is a client side flow chart of an embodiment of the present invention of generating a vendor proposal. In particular, FIG. 4 is further illustrative of a step 302 (i.e. Generate Vendor Proposal) of FIG. 3. An account proposal may be opened at a step 404. Product configuration information may be entered at a step 408 in accordance with buyer choices. As configuration information is entered, pricing models may be applied to a proposal. In particular, at a step 412, pricing guidance and configuration suggestion may be utilized to compare or adjust pricing.

Figure 5:
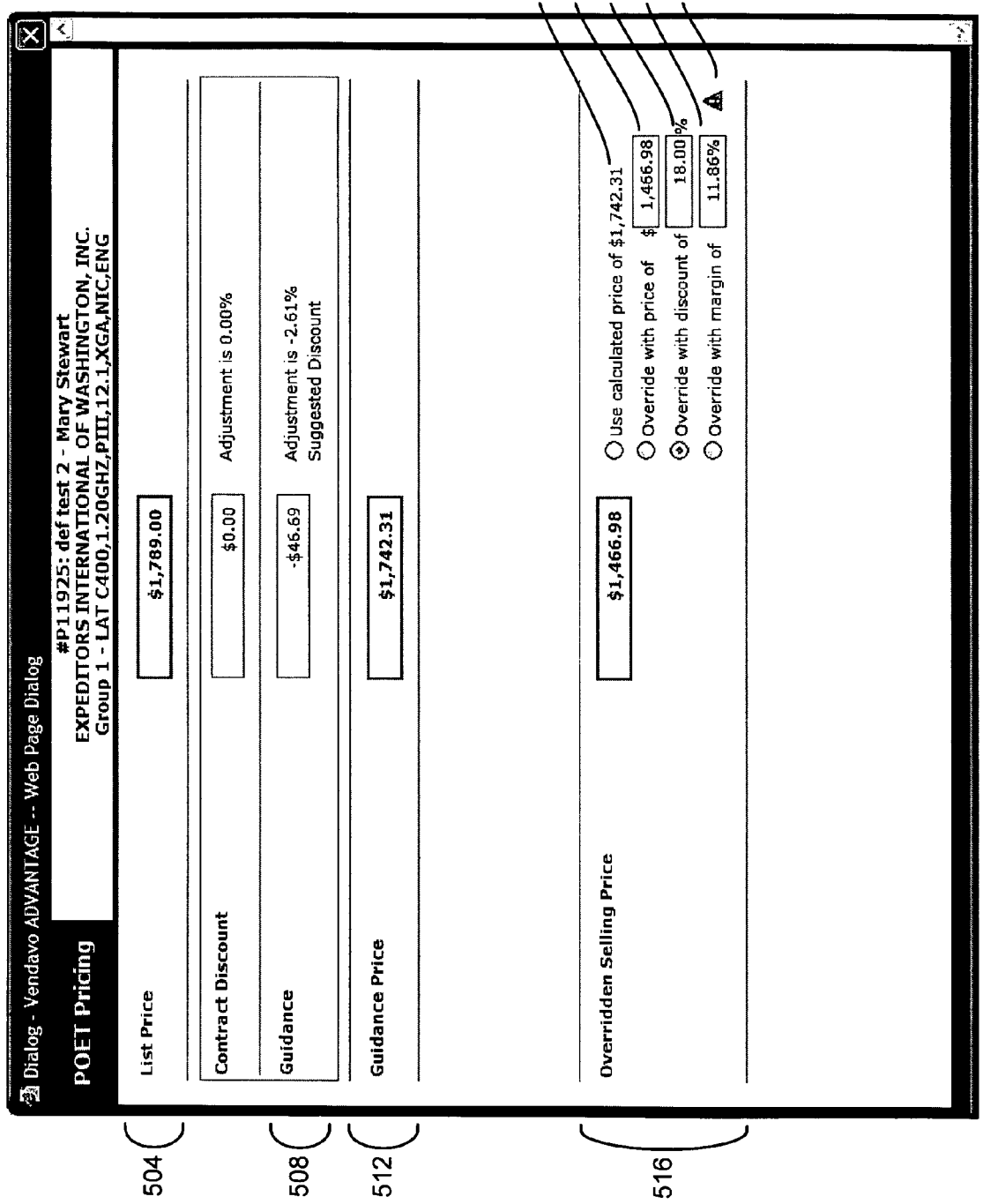
FIG. 5 is a client-side example embodiment of displaying guidance.

Turning to FIG. 5, FIG. 5 is an example user interface in accordance with an embodiment of the present invention. In particular, FIG. 5 is a client-side example embodiment of displaying guidance. A list price may be entered in section 504. A list price may be manually entered by a user or may be automatically entered corresponding to a given configuration and shop keeping unit (SKU) number. Guidance is displayed section 508. In displayed section 508, guidance may be displayed either as a dollar amount or as a percent of total or both. In this example, guidance is automatically generated from a series of back-side decisions that will be discussed in further detail below for FIG. 10.

A guidance price may then be calculated and displayed in section 512. In order to flexibly meet user needs, an actual selling price may be overridden as displayed in section 516. A user may have options of using the calculated guidance price 524; an override price 528; an override discount 532; or an override margin 540. An override selling price may be displayed when an override is selected. In this example, an override discount 532 has been selected and an override selling price has been calculated and displayed in accordance with that selection.

Each of the override fields (528-536) may also contain, for example, an approval field 540. An approval field indicates whether an override parameter may be flagged for approval (see Step 310, FIG. 3). In this example, an approval flag is displayed for an override margin 540. In one example, a user may enter a value into any of the three override fields namely override price, override discount, or override margin. Upon entering a value into any of those fields, the remaining fields may be calculated and displayed. If a margin rule has been violated by the field values (which are different representations of the same value), then a flag may be displayed triggering an approval. Thus, in the example illustrated, an override margin 540 has violated a margin rule triggering a requirement that a quote must be approved before it may be presented to a buyer.

Figure 6:
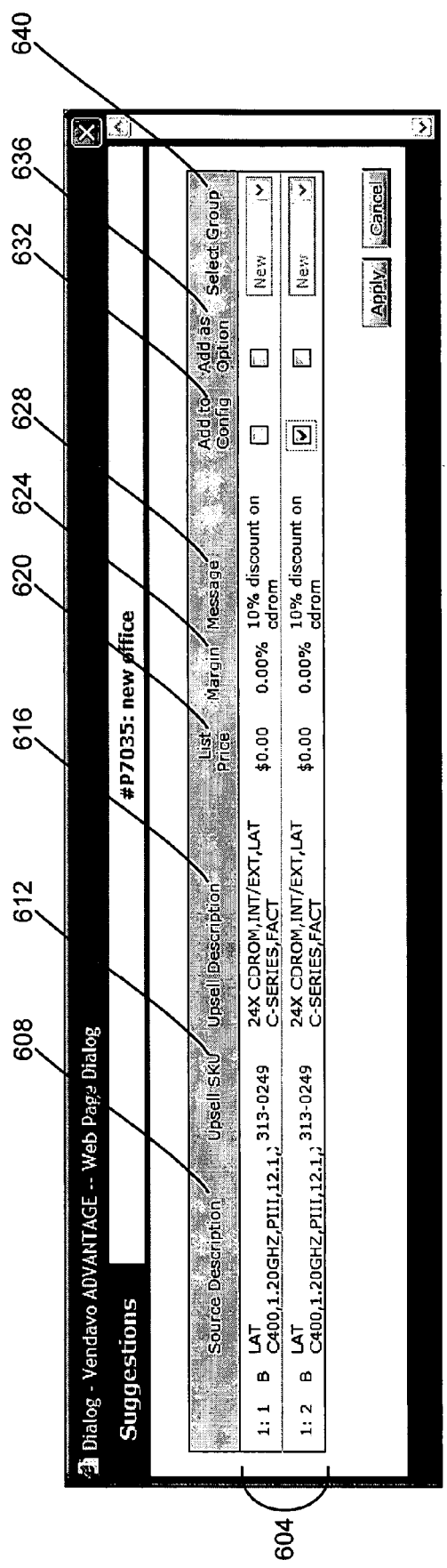
FIG. 6 is a client-side example embodiment of displaying configuration suggestion.

FIG. 6 is an example user interface in accordance with an embodiment of the present invention. In particular, FIG. 6 is a client-side example embodiment of displaying configuration suggestion. A list of configuration suggestions 604 for a selected configuration may be displayed to further enhance proposal generations processes. Each line item of suggestions 604 may correspond to a different configuration described by several descriptors including, but not limited to: a source description 608 that describes a selected configured product; an upsell SKU 612 assigned to a product; an upsell description 616 that describes a product assigned to an upsell SKU; a list price 620 that is the list price of the upsell product; a margin 624 that indicates a margin available for a product; an optional message 628 that gives the user any optional details; an add to configuration checkbox 632 that indicates whether a given product has or will be added to a configuration; an add as option checkbox 636 that indicates whether a given product will be added to an individual line item as an option; and a group field 640 indicating to which group (e.g., a product group) a new line item may be added.

As can be appreciated by one skilled in the art any number of configuration suggestions may be displayed in a resized window depending on user selections. In the described embodiment, an upsell suggestion is illustrated. In other examples, a bundled suggestion may be displayed. In bundled suggestions, additional products may be available as a part of a bundled product for a given configuration. In this manner, sales staff may be easily and efficiently informed with respect to various options offered by a retailer. Other types of configuration suggestions that may be utilized under the present invention may include without limitation downsell related suggestions, collateral or in kind related suggestions, client related suggestions, demographic related suggestions, or regional related suggestions.

Returning to FIG. 4, after pricing has been compared or adjusted to pricing guidance and configuration suggestion, pricing may be selected at a next step 416 whereupon a vendor proposal may be generated at a step 420. An example embodiment of a vendor proposal as contemplated by the present invention is illustrated at FIG. 7.

FIG. 7 is an example user interface in accordance with an embodiment of the present invention. In particular, FIG. 7 illustrates an example vendor proposal in an embodiment of the present invention. A vendor proposal contains sufficient information to enable a user to generate a quotation. Various data sections are included in the present example including, but not limited to: account data 704; proposal indicia data 712; configuration data 716; and margin data 720. In addition, navigation buttons 708 may be utilized to assist a user in accessing relevant information. Account data 704 may contain any number of fields well known in the art to allow sufficient identification of a potential client along with any relevant terms in association with a potential client. Proposal indicia data 712 contains any number of fields well known in the art necessary for internal auditing of a proposal. Configuration data 716 contains any number of fields well known in the art necessary to sufficiently indicate a selected configuration. Configuration data 716 may also contain prospective data where a proposal spans one or more months, quarters, or years.

Step 318—Generate Approved Proposal

Figure 8:
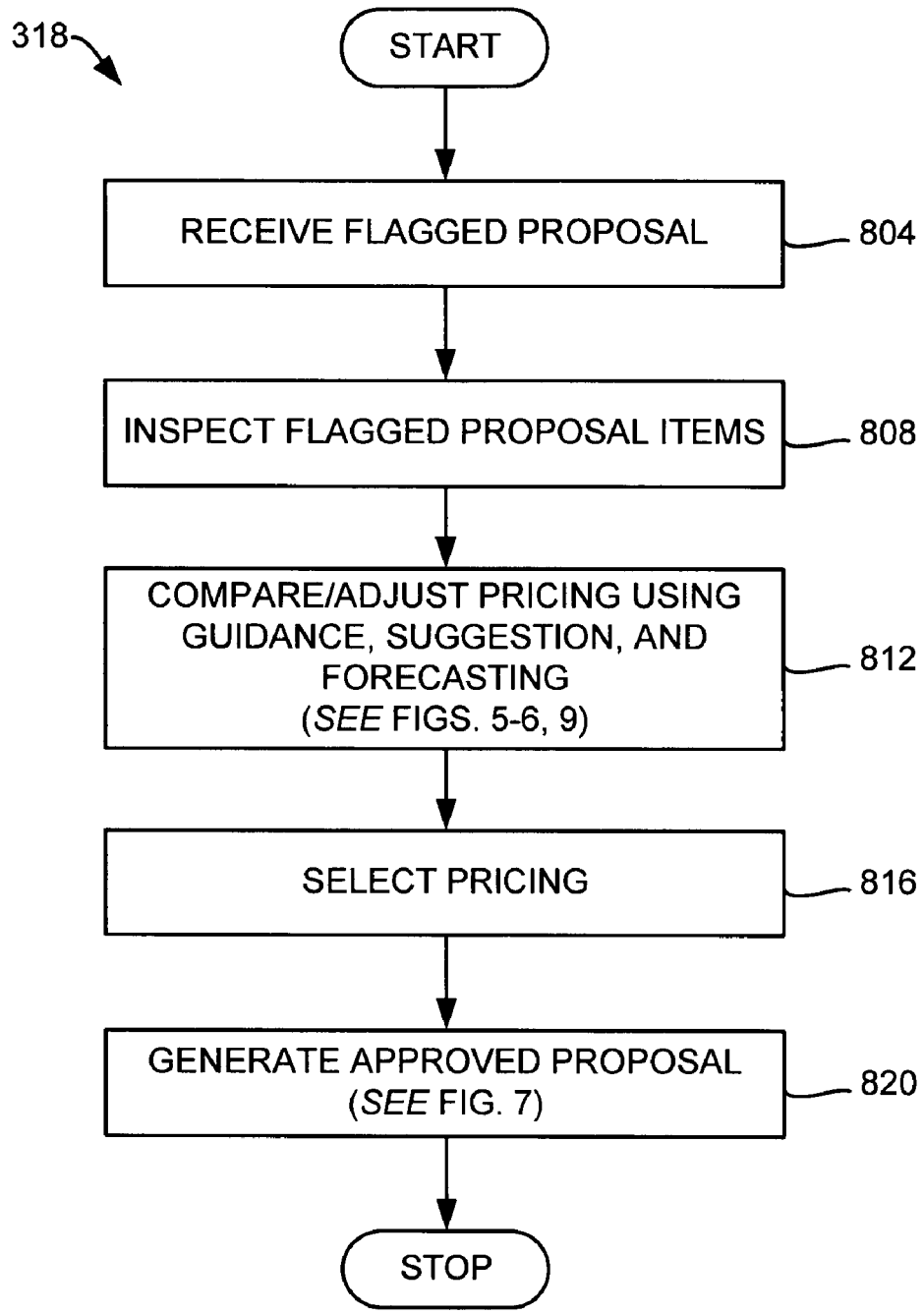
FIG. 8 is further illustrative of a step 318 (i.e. Generate Approved Proposal) of FIG. 3.

FIG. 8 is a client-side flow chart of an embodiment of the present invention of generating an approved proposal. In particular, FIG. 8 is further illustrative of a step 318 (i.e. Generate Approved Proposal) of FIG. 3. As noted above, a parameter may be flagged for approval. Flagging may be configured to respond in any number of ways including, but not limited to, a value or a Boolean expression. For example, a flag may occur if a selected parameter falls outside of a desired range of values. A margin, in one example, may be input by a user that falls outside of a specified range of values established by management. That margin may then be flagged to be further examined by supervisory staff. In another example, a flag may occur if a selected parameter is indicated by a Boolean expression. For example, it may occur that a certain geographic area may not be sold certain configurations according to a current licensing agreement. In this manner, sales for a selected geographic area may be triggered by a simple Boolean expression as is well known in the art.

Thus, in a step 804, a flagged proposal may be received. All flagged parameters may then be inspected at a step 808. That is, an entire proposal history may be examined to determine the nature and type of proposal parameters have been entered. In inspecting flagged proposal items at a step 808, a user may compare and subsequently adjust pricing using guidance, suggestion, and forecasting at a step 812. Guidance and suggestion have been discussed at length above for FIGS. 5-6. As discussed above, pricing guidance and configuration suggestions readily displays relevant proposal information and may assist a user to determine a proposal that may protect sales margins. Forecasting is discussed in further detail below for FIG. 9.

FIG. 9 is an example user interface in accordance with an embodiment of the present invention. In particular, FIG. 9 is a client-side example embodiment of displaying forecast data. As noted above, forecast data may comprise, in some examples, forward looking price estimations for a product or product set, which may be stored in a transaction and policy database. Forecast data may be used to generate sales policies such as guidance and suggestion as noted above. Still further, forecast data may be utilized by management teams to analyze a given deal to determine whether a margin corresponding to a deal may be preserved over a given period of time. In this manner, an objective measure for deal approval may be implemented. As shown in FIG. 9, a number of components may be listed 904 according to any listing criteria including, but not limited to: SKU number, alphanumeric order, component hierarchy, price, quantity, or any other indicator. A forecast portion 900 of a user interface may be displayed as shown. Further, forecast data may be displayed using colors. In this example, an upward change in a forecast cost 908 may be displayed using a first color (e.g., red). In other words, the next value for a given time interval may be colored to indicated the direction of the forecast cost (i.e. upward, stable, and downward). In likewise manner, a stable forecast cost 912 may be displayed using a second color and a downward change in a forecast cost 916 may be displayed using a third color. In this manner a user may readily and visually ascertain any trends in pricing over a given period of time. In some embodiments, one or more months may be displayed. In still other embodiments, only prospective data is displayed.

As can be appreciated, by displaying forecast data in graphic fashion, margins may be examined over longer periods of time. By examining forecast data in this manner, concessions in pricing may be made at the time of proposal generation that may not appear to preserve sales margins, but will, in fact, result in a quality deal over time. In the past, this kind of information was not readily available in a price adjustment system as noted above. Further, although the embodiment described displays forecast data only to supervisory staff, forecast data may be further displayed to general sales users under the present invention as contemplated.

Returning to FIG. 8, after pricing has been compared or adjusted to pricing guidance, configuration suggestion, and forecast data, pricing may be selected at a next step 816 whereupon an approved proposal may be generated at a step 820. An example embodiment of an approved proposal as contemplated by the present invention is illustrated at FIG. 7 and is discussed in further detail above.

Back-Side Operations: Pricing Guidance and Configuration Suggestion

The utility of any pricing system is at least partially dependent on the rationale of the underlying logic. As can be appreciated, a logical schema must be flexibly implemented in order to achieve broad efficiencies. Pricing guidance and configuration suggestion examples for users has been described above. Underlying logic for pricing guidance and configuration suggestion is now described.

Figure 10:
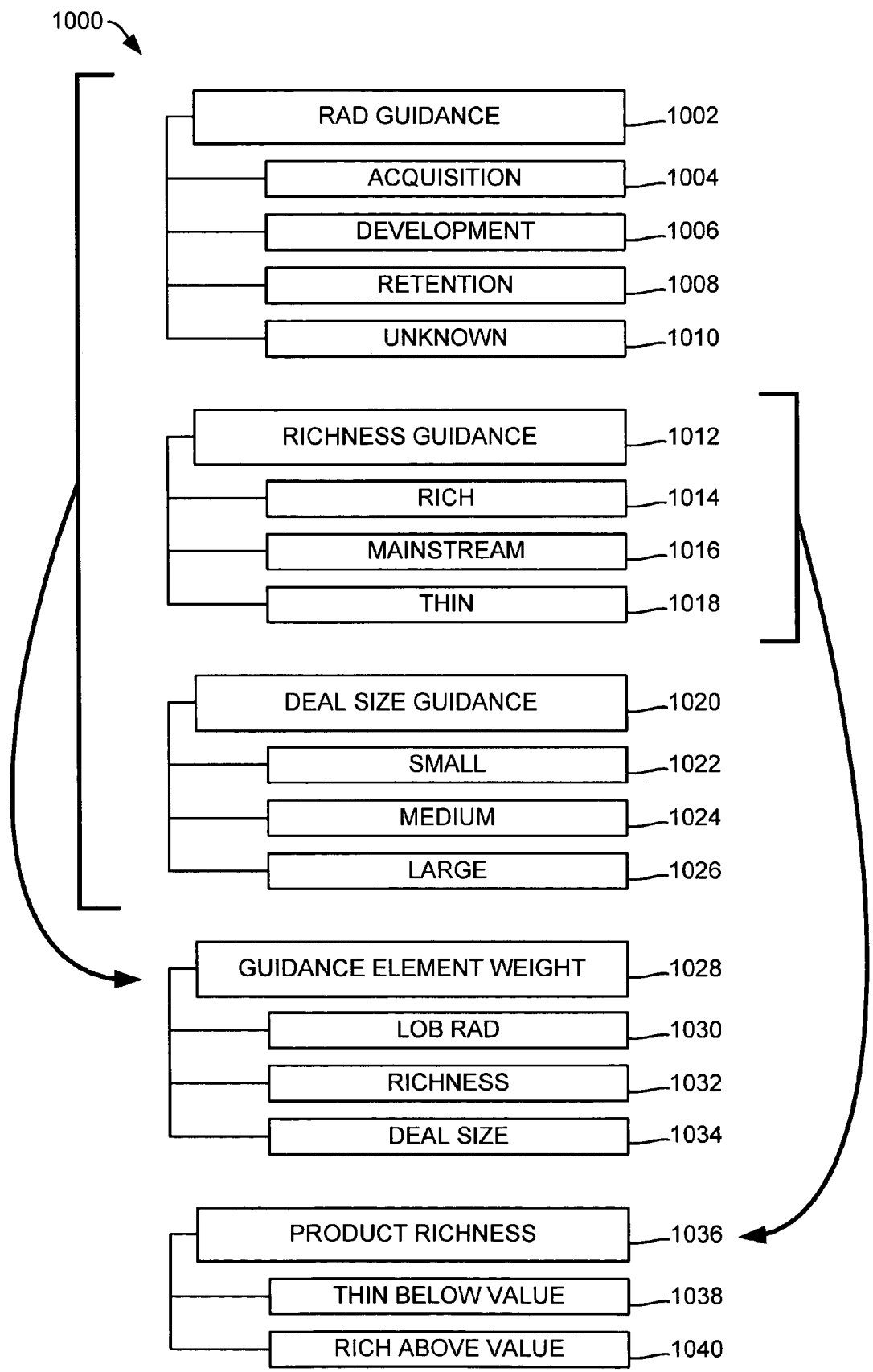
FIG. 10 is an illustrative example of backside guidance hierarchy in accordance with an embodiment of the present invention.

FIG. 10 is an illustrative example of backside guidance hierarchy in accordance with an embodiment of the present invention. In particular, Retention, Acquisition, and Development (RAD) guidance 1002 may describe guidance impact to an account in terms of business stage development by line of business (LOB). For example, businesses may typically be categorized in various states of development by LOB including acquisition 1004 development 1006, retention 1008, and unknown 1010. By LOB refers to the concept that a client may be in one stage of development for one category of products (e.g., laptops) and in another stage of development for a different product line (e.g., servers). An adjustment may be made for each of the relationships depending on business objectives of a company. For example, the following adjustments may be made for a given account group along a given product line: acquisition adjustment −60%; development adjustment −40%; retention adjustment=10%; and unknown adjustment 10%. In this example, adjustments to pricing may be established to reflect a given business objective. That is, acquiring business and new business may be encouraged to buy where pricing is offered at a deep discount (60% and 40% respectively) while retained business and unknown business may be maintained at a lower discount (10% and 10% respectively). Adjustments may be made upward or downward without limitation depending on business objectives. These adjustments may then form the basis for pricing guidance as described in FIG. 5 above.

Richness guidance 1012 represents another top level guidance element. Richness guidance 1012 describes guidance impact to an account in terms of configuration richness. That is, a configuration that is rich generally may have more features or may feature more current technology. For example, a rich computer system may contain a current chip set along with extended memory, a large display, large disk capacity, and high video capability while a thin computer system may contain an older, more limited chip set, more limited memory, a small display, small disk capacity, and low video capability. In one embodiment, richness may be subdivided into rich 1014, mainstream 1016, and thin 1018. As noted above, an adjustment may be made for each of the relationships depending on business objectives of a company. Further, as noted above, adjustments may be made upward or downward without limitation depending on the business objectives.

Deal size guidance 1020 represents another example top level guidance element. Deal size guidance 1020 describes guidance impact to an account in terms of the size of a particular deal. Deal size may generally be related to a dollar value and may be adjusted by magnitude without limitation depending on a particular buyer. In one embodiment, deal size may be subdivided into small 1022, medium 1024, and large 1026. In one example each subdivision represents a range of values. In other examples each subdivision is marked by a threshold amount. As noted above, an adjustment may be made for each of the relationships depending on business objectives of a company. Further, as noted above, adjustments may be made upward or downward without limitation depending on the business objectives.

Guidance element weight 1028 specifies the relative importance of previously described elements RAD guidance 1002, richness guidance 1012, and deal size guidance 1020 when calculating an overall guidance pricing structure. In one embodiment, LOB RAD 1030 corresponds to RAD guidance 1002; richness 1032 corresponds to richness guidance 1012; and deal size 1034 corresponds to deal size guidance 1020. Other guidance elements and corresponding weighting elements are contemplated under the present invention. In one example, weighting is accomplished by entering a percentage of weight for each weight element. Thus, for example, LOB RAD 1030 may be weighted at 30%; richness 1032 at 45%; and deal size 1034 at 25%. In this example, richness will influence overall guidance with LOB RAD and deal size following. As noted above, an adjustment may be made for each of the relationships without limitation depending on business objectives of a company.

Product richness 1036 specifies price threshold above and below which a product should be considered 'rich' or 'thin' as discussed for richness guidance element 1012. In one embodiment a thin threshold value comprises a threshold value below which a product may be considered thin. Typically, the value is a dollar amount corresponding to a product or product set. In like manner, in another example, a rich threshold value comprises a threshold value above which a product may be considered rich. Typically, the value is a dollar amount corresponding to a product or product set. Where the ranges corresponding to a thin threshold value and a rich threshold value are non-overlapping, the difference between values comprises a range of values corresponding to a mainstream richness designation. Where the ranges corresponding to a thin threshold value and a rich threshold value overlap, an error message may be generated. In this manner product richness may be quantified.

FIG. 11 is an example user interface in accordance with an embodiment of the present invention. In particular, FIG. 11 is a back-side example embodiment of configuring an upsell configuration suggestion. Upsell specifies promotional product up-sell relationships. That is, for a selected product, product set, groups of product sets, or services, corresponding products, product sets, groups of product sets, or services may be configured as upsell suggestions for proposals. For example, a configuration having a four-cell battery may be configured to suggest an eight-cell battery having an increased capacity. One advantage presented by the present invention is that promotional products may be readily and efficiently accessed by sales staff. Another advantage for upselling a product is that margins may be increased.

In the embodiment illustrated in FIG. 11 a number of fields are displayed (1104-1116) for use in configuring upsell suggestions. A number of qualifying fields are illustrated at section 1104. In this example, suggestions may be qualified by an account group, an industry, or a product group. Typically, suggestions are implemented in a hierarchical architecture; however, in some embodiments a hierarchical architecture need not be utilized. In some embodiments a look up table may be utilized in order to efficiently and accurately make selections. A driver SKU 1106 corresponds to a targeted product, product set, product group, or service. In some embodiments, driver SKUs may be accessed via a look up table. A description 1108 describes, in plain language for example, a product, product set, product group or service corresponding to a selected driver SKU. In the example shown, two driver SKUs and corresponding descriptions are illustrated. However, one or many driver SKUs and corresponding descriptions are contemplated within the scope of the present invention.

An upsell SKU 1110 is a selected product SKU associated with a driver SKU 1106. An upsell SKU 1110 may be selected from a lookup table corresponding to associated driver SKUs. In this manner configuration compatibility may be assured since only a list of available and compatible products may be available. As with a driver SKU 1106, an upsell SKU 1110 has a corresponding description 1112. A description 1112 describes, in plain language for example, a product, product set, product group or service corresponding to a selected upsell SKU. In some embodiments a suggested discount 1113 may be entered. A discount for a given upsell product or service may help to further promote selected products or services. A date range represented by start and end dates 1114 may be selected in order to confine a configured suggestion to a desired time frame. Further, a suggestion may be configured to be forced or optional via a force selection box 1116. In an example of a forced suggestion, the effect to a user would be that replacing a driver product with an upsell product would be automatically displayed; however, a user selection would not be mandatory. When force selection box 1116 is not selected, suggestions may not be displayed. Results from suggestion configurations input may then be displayed graphically in section 1118. Any number of configurations may be viewed and sorted in accordance with user preferences.

Figure 12:
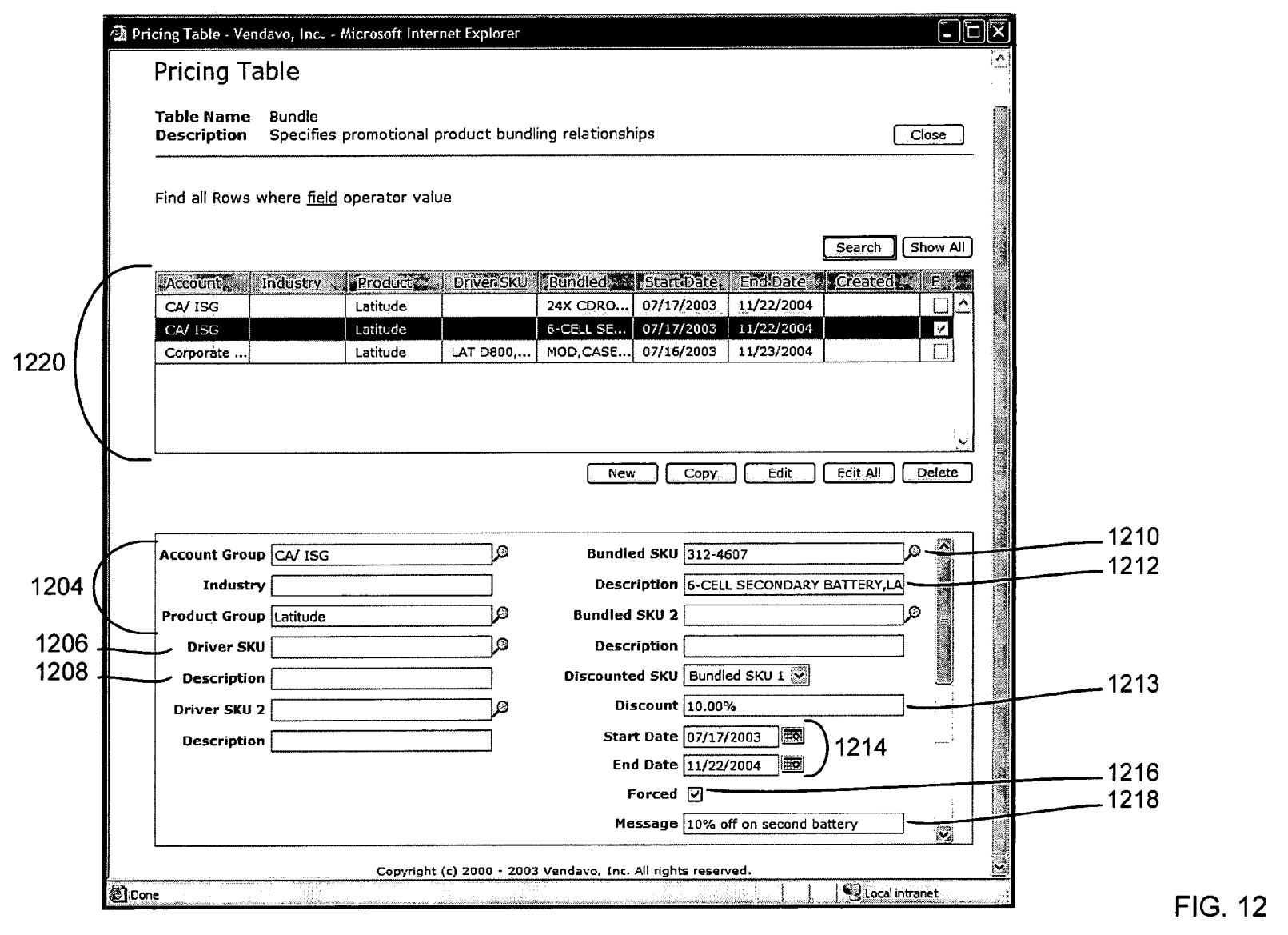

FIG. 12 is an example user interface in accordance with an embodiment of the present invention. In particular, FIG. 12 is a client-side example embodiment of displaying a bundle suggestion. Bundle specifies promotional product bundling relationships. That is, for a selected product, product set, groups of product sets, or services, corresponding products, product sets, groups of product sets, or services may be configured as bundled suggestions for proposals. For example, a configuration having a four-cell battery may be configured to suggest an additional eight-cell battery having an increased capacity. One advantage presented by the present invention is that promotional products may be readily and efficiently accessed by sales staff. Another advantage for bundling a product is that margins may be increased.

In the embodiment illustrated in FIG. 12 a number of fields are displayed (1204-1218) for use in configuring bundling suggestions. A number of qualifying fields are illustrated at section 1204. In this example, products may be qualified by an account group, an industry, or a product group. Typically, suggestions are implemented in a hierarchical architecture; however, in some embodiments a hierarchical architecture need not be utilized. In some embodiments a look up table may be utilized in order to efficiently and accurately make selections. A driver SKU 1206 corresponds to a targeted product, product set, product group, or service. In some embodiments, driver SKUs may be accessed via a look up table. A description 1208 describes, in plain language for example, a product, product set, product group or service corresponding to a selected driver SKU. In the example shown, two driver SKUs and corresponding descriptions are illustrated. However, one or many driver SKUs and corresponding descriptions are contemplated within the scope of the present invention.

A bundled SKU 1210 is a selected product SKU associated with a driver SKU 1206. A bundled SKU 1210 may be selected from a lookup table corresponding to associated driver SKUs. In this manner configuration compatibility may be assured since only a list of available and compatible products may be available. As with a driver SKU 1206, a bundled SKU 1210 has a corresponding description 1212. A description 1212 describes, in plain language for example, a product, product set, product group or service corresponding to a selected bundled SKU. In some embodiments a suggested discount 1213 may be entered. A discount for a given bundled product or service may help to further promote selected products or services. A date range represented by start and end dates 1214 may be selected in order to confine a configured suggestion to a desired time frame. Further a suggestion may be configured to be forced or optional via a force selection box 1216. In an example of a forced suggestion, the effect to a user would be that selling a driver product with a bundled product would be automatically displayed; however, a user selection would not be mandatory. When force selection box 1216 is not selected, suggestions may not be displayed. A message box 1218 may be further configured to display a message when a bundled suggestion is presented. Results from suggestion configurations input may then be displayed graphically in section 1220. Any number of configurations may be viewed and sorted in accordance with user preferences.

As can be appreciated, the examples described herein detail guidance pricing, configuration suggestion, and forecasting in embodiments of the present invention. Other methods and uses that may be used in combination with guidance pricing, configuration suggestions, and forecasting are contemplated by the present invention.

While this invention has been described in terms of several preferred embodiments, there are alterations, permutations, modifications and various substitute equivalents, which fall within the scope of this invention. It should also be noted that there are many alternative ways of implementing the methods and systems of the present invention. It is therefore intended that the following appended claims be interpreted as including all such alterations, permutations, modifications, and various substitute equivalents as fall within the true spirit and scope of the present invention. In addition, the use of subtitles in this application is for clarity only and should not be construed as limiting in any way.

What is claimed is:

1. A method of generating margin sensitive pricing quotation for a customer in an integrated price adjustment system comprising:

selecting at least one product in a selected product set;

providing pricing data corresponding to the at least one product in the selected product set;

providing at least one guidance element for the at least one product in the selected product set, wherein the at least one guidance element is margin sensitive;

calculating, using a computer, a guidance price for the at least one product based upon the at least one guidance element, wherein the at least one guidance element is selected from the following business priorities, business cycle guidance, richness guidance, and deal size guidance, and wherein business cycle guidance is dependent upon stage of business development with the customer, richness guidance is dependent upon feature number and quality for the product, and deal size guidance is dependent upon a magnitude of total value of the pricing data corresponding to the at least one product;

receiving a margin rule, wherein the margin rule includes one of an established value and a Boolean expression;

receiving a value for at least one override of a group of overrides, wherein the group of overrides includes an override price, an override discount and an override margin;

calculating, using the received value of the at least one override, values for remaining overrides of the group of overrides, wherein the remaining overrides are all the overrides excluding the at least one override for which the value was received;

comparing the values for each of the overrides to the margin rule, wherein the values for the override price, the override discount and the override margin which violate the margin rule are flagged;

presenting the guidance price and the override price on a display;

receiving a selection of one of either the override price or the guidance price; and generating a quotation based upon the selection such that margin sensitive pricing adjustments are incorporated into the quotation.

2. The method of claim 1, wherein the product set corresponds to a single shop keeping unit (SKU) that uniquely represents a product in a catalog of products.

3. The method of claim 1 wherein the guidance element is further weighted relative to selected business priorities.

4. The method of claim 3 wherein the guidance element is further delimited by at least one threshold value.

5. The method of claim 1 wherein the guidance element is user defined.

6. The method of claim 1 further comprising providing predetermined suggestions for modifying the quotation.

7. The method of claim 6 wherein the suggestions are either upsell suggestions or bundled suggestions.

8. The method of claim 6 wherein the suggestions are configured such that the suggestions are enforced in the quotation.

9. The method of claim 6 wherein the suggestions may be overridden by user input.

10. A computer program product for use in conjunction with a computer system for generating margin sensitive pricing quotation for a customer in an integrated price adjustment system, the computer program product comprising a computer readable storage medium and a computer program mechanism embedded therein, the computer program product comprising:

instructions for selecting at least one product in a selected product set;

instructions for providing pricing data corresponding to the at least one product in the selected product set;

instructions for providing at least one guidance element for any of the at least one product in the selected product set wherein the at least one guidance element is margin sensitive;

instructions for calculating a guidance price for the at least one product based upon the at least one guidance element, wherein the at least one guidance element is selected from the following business priorities, business cycle guidance, richness guidance, and deal size guidance, and wherein business cycle guidance is dependent upon stage of business development with the customer, richness guidance is dependent upon feature number and quality for the product, and deal size guidance is dependent upon a magnitude of total value of the pricing data corresponding to the at least one product;

instructions for receiving a margin rule, wherein the margin rule includes one of an established value and a Boolean expression;

instructions for receiving a value for at least one override of a group of overrides, wherein the group of overrides includes an override price, an override discount and an override margin;

instructions for calculating, using the received value of the at least one override, values for remaining overrides of the group of overrides, wherein the remaining overrides are all the overrides excluding the at least one override for which the value was received;

instructions for comparing the values for each of the overrides to the margin rule, wherein the values for the override price, the override discount and the override margin which violate the margin rule are flagged;

instructions for presenting the guidance price and the override price on a display;

instructions for receiving a selection of one of either the override price or the guidance price; and instructions for generating a quotation based upon the selection such that margin sensitive pricing adjustments are incorporated into the quotation.

11. The computer program product of claim 10, wherein the product set corresponds to a single shop keeping unit (SKU) that uniquely represents a product in a catalog of products.

12. The computer program product of claim 10 wherein the guidance element is further weighted relative to selected business priorities.

13. The computer program product of claim 12 wherein the guidance element is further delimited by at least one threshold value.

14. The computer program product of claim 10 wherein the guidance element is user defined.

15. The computer program product of claim 10 further comprising providing predetermined suggestions for modifying the quotation.

16. The computer program product of claim 15 wherein the suggestions are either upsell suggestions or bundled suggestions.

17. The computer program product of claim 15 wherein the suggestions are configured such that the suggestions are enforced in the quotation.

18. The computer program product of claim 15 wherein the suggestions may be overridden by user input.

19. The method of claim 1 wherein the business cycle guidance includes an acquisition adjustment, a retention adjustment, a development adjustment and an unknown-business relationship adjustment, wherein the unknown-business relationship adjustment is an adjustment applied to quotations involving products in an unknown stage of business development.

20. The computer program product of claim 11, wherein the business cycle guidance includes an acquisition adjustment, a retention adjustment, a development adjustment and an unknown-business relationship adjustment, wherein the unknown-business relationship adjustment is an adjustment applied to quotations involving products in an unknown stage of business development.

21. System for generating a margin sensitive pricing quotation for a customer comprising:

a computer system, including at least one database and a display, configured to:

select at least one product in a selected product set;

provide pricing data corresponding to the at least one product in the selected product set;

provide at least one guidance element for the at least one product in the selected product set wherein the at least one guidance element is margin sensitive;

calculate a guidance price for the at least one product based upon the at least one guidance element, wherein the at least one guidance element is selected from the following business priorities, business cycle guidance, richness guidance, and deal size guidance, and wherein business cycle guidance is dependent upon stage of business development with the customer, richness guidance is dependent upon feature number and quality for the product, and deal size guidance is dependent upon a magnitude of total value of the pricing data corresponding to the at least one product;

receive a margin rule, wherein the margin rule includes one of an established value and a Boolean expression;

receive a value for at least one override of a group of overrides, wherein the group of overrides includes an override price, an override discount and an override margin;

calculate, using the received value of the at least one override, values for remaining overrides of the group of overrides, wherein the remaining overrides are all the overrides excluding the at least one override for which the value was received;

compare the values for each of the overrides to the margin rule, wherein the values for the override price, the override discount and the override margin which violate the margin rule are flagged;

present the guidance price and the override price on the display;

receive a selection of one of either the override price or the guidance price; and generating a quotation based upon the selection such that margin sensitive pricing adjustments are incorporated into the quotation.

22. The system of claim 21 wherein the business cycle guidance includes an acquisition adjustment, a retention adjustment, a development adjustment and an unknown-business relationship adjustment, wherein the unknown-business relationship adjustment is an adjustment applied to quotations involving products in an unknown stage of business development.

* * * * *